United States Patent Office 2,800,388
Patented July 23, 1957

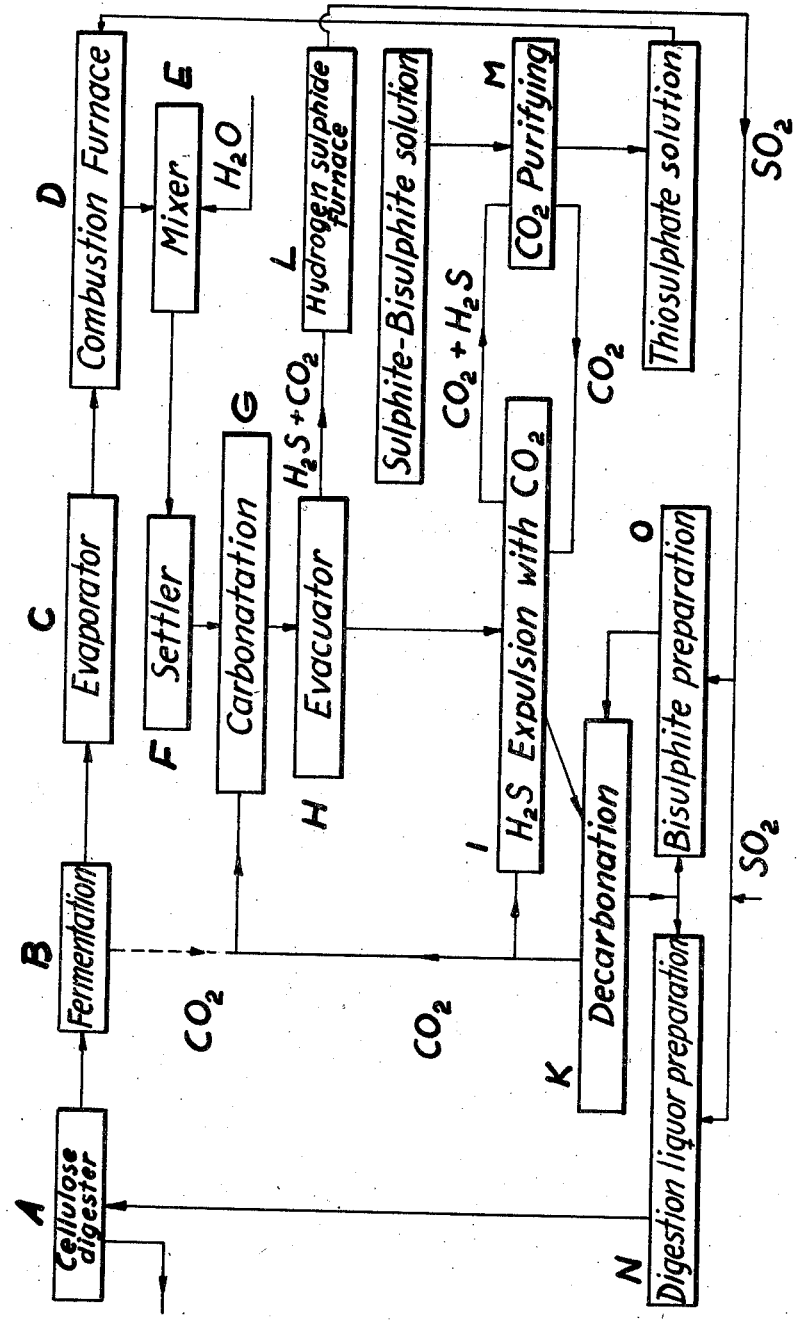

2,800,388

RECOVERY OF ALKALI AND SULPHUR FROM WASTE LYES IN THE MANUFACTURE OF CELLULOSE WITH ALKALI SULPHITE AND ALKALI BISULPHITE

Nils Knut Gabriel Ahlborg and Karl Nicolaus Cederquist, Falun, Sweden, assignors to Stora Kopparbergs Bergslags Aktiebolag, Falun, Sweden, a corporation of Sweden Application September 6, 1955, Serial No. 532,391

Claims priority, application Sweden July 14, 1955

3 Claims. (Cl. 23—48)

The present invention, which refers to the recovery of the chemicals from waste lyes in the manufacture of cellulose by decomposition of ligno-cellulosic materials, such as wood, straw, peat-moss, with alkali sulphite and/or alkali bisulphite and free $SO_2$ in one or more steps, is applicable in all such cases where the obtained waste lye contains ligno-sulphonates of alkali metals, such as sodium ligno-sulphonate.

If such sodium-containing waste lyes are evaporated, entirely or in part, for instance to an approximate dryness or to a dryness of 40–60%, and is combusted in a soda-works unit, a melt soda will be obtained, which principally consists of soda, sodium sulphide and smaller quantities of sodium sulphate, sodium sulphite and thiosulphate.

It has been known since long ago to recover the major portion of the sulphide sulphur of the solution out of solutions of this melt soda in a process, where the solution is carbonated with carbonic acid, carbonate and sodium hydroxide formed at the hydrolysis of the alkali sulphide being then transformed into bicarbonate, whereupon the sulphide sulphur is removed in the form of hydrogen sulphide out of this solution by expulsion with water vapour under vacuum. The hydrogen sulphide may be recovered and combusted in known manner into $SO_2$. The solution relieved of sulphide sulphur may be converted with $SO_2$ in a gaseous state or in an aqueous solution or with bisulphite solution, perhaps with free $SO_2$, free and bound carbonic acid then escaping in a gaseous state (decarbonation) and a $Na_2SO_3$-solution being obtained which may be treated further into sulphite digesting liquor. The carbonic acid is recovered for the carbonation.

To bring forth a perfect sulphite digesting liquor in a process of this type, it is of paramount importance that the percentage of thiosulphate in the solution is not appreciably increased during the course of the process, inasmuch as too high a percentage of thiosulphate in the sulphite digesting liquor may render the decomposition more difficult cause black liquor as well as considerably increased corrosive attacks on conduits and fixtures. The percentage of thiosulphate also increases the digesting period.

Thiosulphate may be formed either by the sulphide sulphur in a solution with a relatively high percentage of sulphide being oxidized by the oxygen at a contact with oxygen-containing gases, or by the carbonated and expelled solution still containing sulphide sulphur, which gives thiosulphate at a reaction with $SO_2$ or with bisulphite in the decarbonation step. Therefore, it has proved to be essential, first, that the carbonation is carried into effect with carbonic acid free from oxygen, preferably with carbonic acid of a percentage of 100%, and, second, that the solution conveyed to decarbonation is relieved of sulphide sulphur, entirely or nearly so.

It is not particularly difficult to expel 90–95% of the sulphide sulphur from melt soda solutions, for instance by carbonation and subsequent expulsion of hydrogen sulphide under vacuum. Difficulties present themselves only when the sulphide sulphur is to be expelled completely, and to remove the residual sulphur a number of different methods have therefore been proposed, all of which have nevertheless made the process considerably more expensive or have entailed other drawbacks, such as the formation of thiosulphate, the introduction of chlorine ions, and so forth.

There are many patents for methods aiming at the removal of the residual sulphide sulphur upon a preceding expulsion of the main part of the sulphide sulphur.

For example, the residual sulphide sulphur is removed by oxidation with chlorine according to the U. S. Patents No. 1,864,619 and No. 1,904,170.

According to the U. S. Patent No. 2,675,297, the residual sulphide sulphur is expelled by repeated carbonations and subsequent expulsions with water vapour under vacuum.

According to the Swedish Patent No. 136,887, the residual sulphide sulphur is expelled by the supply of large quantities of $CO_2$-containing gases, such as flue gases, in a counter-current.

The method according to the present invention makes it possible to remove and to recover the residual sulphide sulphur in a simpler and economically more advantageous manner, after the main part of the sulphide sulphur has been removed from the melt soda solution according to known methods.

The method according to the invention involves that the residual sulphide sulphur is removed in the form of hydrogen sulphide and is recovered in the form of thiosulphate by treating the solution with carbonic acid in a first step, for instance by conveying pure carbonic acid in a column apparatus or a scrubber in a counter-current against the solution in a quantity such that the hydrogen sulphide is expelled and escapes in a mixture with the escaping carbonic acid. This carbonic acid is relieved of its content of hydrogen sulphide in a second step by the gas being brought into contact with a sulphide and/or bisulphite solution, for instance in a column apparatus or a scrubber, the hydrogen sulphide being then quantitatively transformed substantially into thiosulphate together with other non-volatile sulphur compounds. The carbonic acid relieved of sulphur is recirculated to the first step for the expulsion of further hydrogen sulphide.

The thiosulphate solution is transferred into the combustion furnace for evaporated sulphide lye, whereby thiosulphate and the other sulphur compounds are again reduced into sulphide and returned to the melt soda.

Out of the obtained soda-bicarbonate-solution relieved of sulphur the carbonic acid is recovered in a pure state in the preparation of the carbonic acid, and is returned to the carbonation, optionally over an expulsion tower, where the solution coming from the evacuation is caused to meet the carbonic acid in a counter-current, a portion of the hydrogen sulphide being then returned to the carbonation, before the solution goes further for the removal of the residual sulphide sulphur according to the present method. The carrying of the method into effect will appear from the following and from the flow diagram shown in the accompanying drawing.

From the cellulose digesting plant A the sulphite waste lye is conveyed, optionally over the fermentation unit B, to the evaporating unit C, where it is evaporated to a percentage of dryness of approximately 50%, whereupon it is transferred to the combustion furnace D, where all organic matter is combusted and the residual chemicals leave the furnace in the form of a melt containing substantially $Na_2S$ and $Na_2CO_3$ and smaller quantities of $Na_2SO_4$, $Na_2S_2O_3$ and $Na_2SO_3$. This melt is caused to flow down into the melting soda mixer E for dissolution in water. This solution is conveyed to the settler F, where the solution is allowed to settle for the purpose of removing insoluble particles. From the settler F the solution is pumped into the carbonation vessel G, where it is carbonated with pure carbonic acid obtained from the decarbonation unit K. The carbonated solution is conveyed to the evacuating vessel H, where the main part of hydrogen sulphide escapes through the evacuating pump to the hydrogen sulphide furnace L, where it is combusted into $SO_2$, which escapes to the system via the digesting liquor preparation unit N. From H the solution is pumped into the top of the column I, where it meets carbonic acid from the $CO_2$-purifying apparatus M and the decarbonation unit K in a counter-current. The $CO_2$—$H_2S$—gas mixture flows to the $CO_2$-purifying apparatus M, whereas the solution relieved of sulphide sulphur and escaping from the bottom of the column is transferred to the decarbonation unit K, where $CO_2$ is freed with $SO_2$ or Na-bisulphite and is returned to the carbonation vessel G and the $H_2S$-expulsion column I. The decarbonated solution coming from K flows to O for the preparation of bisulphite for the decarbonation unit K as well as to N for the preparation of further digesting liquor, which returns to the digesting plant A. In the $CO_2$-purifying apparatus M the entering $CO_2$—$H_2S$—mixture is relieved of $H_2S$ through reaction with a solution of $Na_2SO_3$ and/or $NaHSO_3$. The pure carbonic acid returns to the $H_2S$-expulsion column I, whereas the thiosulphate solution formed through the reaction of the hydrogen sulphide with the sulphite mixture is transferred to the combustion furnace D, optionally over the evaporating unit C. The sulphite-bisulphite-solution is prepared from NaOH, soda or recovered sulphite solution through the introduction of sulphur dioxide.

If this method for the removal of the residual sulphide sulphur is combined for instance with a method involving a carbonation and an incomplete expulsion of hydrogen sulphide under vacuum in or not in presence of water vapour, the following advantages will be attained:

1. The main part of the sulphide sulphur in the solution is expelled at a small consumption of heat and only with a small loss of carbonic acid in consequence thereto.
2. The residual sulphide is expelled without any supply of heat.
3. No loss of carbonic acid is involved in the expulsion of the residual sulphide sulphur.
4. Since no loss of carbonic acid is involved in the expulsion of the residual sulphide sulphur according to the present method, the flow of carbonic acid may be abundant with a good margin for the obtention of a safe expulsion of the residual sulphide sulphur.
5. As the loss of carbonic acid in connection with a simple carbonation and an incomplete expulsion of hydrogen sulphide under vacuum is very small, the combination will be self-supporting with respect to carbonic acid. In other words, the losses of carbonic acid are well covered by the carbonate carbonic acid contained in the melt soda.
6. The treated melt soda solution is in its entirety directly serviceable for the preparation of new digesting liquor.
7. The recovery of sulphur and alkali out of the melt soda solution is complete.

What is claimed is:

1. A method of recovering sulphur and alkali from the sulphite waste lye obtained in digesting cellulose with a member of the group consisting of alkali sulphites and bisulphites which comprises evaporating said lye and combusting same to obtain a melt soda containing soda and sulphide sulphur, carbonating an aqueous solution of said melt soda with substantially pure, oxygen-free carbon dioxide, and removing from said melt soda solution the main part of the sulphide sulphur therein as hydrogen sulphide, thereafter further carbonating the melt soda solution from which the main part of said sulphide sulphur has been removed by blowing substantially pure, oxygen-free carbon dioxide therethrough and expelling the residual sulphide sulphur in said melt soda solution as hydrogen sulphide in the form of a gaseous mixture with carbon dioxide, relieving said gaseous mixture of hydrogen sulphide by treating said mixture with an aqueous solution of a member of the group consisting of alkali sulphites and bisulphites whereupon said hydrogen sulphide is converted to thiosulphate and other sulphur compounds in aqueous solution and the carbon dioxide gas is rendered substantially pure, thereafter recycling the thus purified carbon dioxide gas to said further carbonating step for use in expelling residual sulphide sulphur from additional melt soda solution from which the main part of said sulphide sulphur has been removed, treating the melt soda solution from which residual sulphide sulphur has been removed with a member of the group consisting of sulphur dioxide and sodium bisulphite whereby at least substantially all of the carbon dioxide bound in said melt soda solution is expelled in a substantially pure state and an aqueous solution suitable for use as a digesting liquor is obtained, the thus expelled carbon dioxide being recycled for use in said abovementioned carbonating steps.

2. The method of claim 1 wherein all of the carbon dioxide utilized in said carbonating steps is obtained from the melt soda undergoing treatment.

3. A method according to claim 1, characterized in that thiosulphate solution formed is combusted with the evaporated sulphite waste lye for the purpose of recovering the chemicals therein.

References Cited in the file of this patent

UNITED STATES PATENTS

| | | |
|---|---|---|
| 1,639,905 | Sperr, Jr. et al. | Aug. 23, 1927 |
| 1,862,900 | Lynn et al. | June 14, 1932 |
| 2,675,297 | Gray et al. | Apr. 13, 1954 |